Patented Feb. 10, 1942

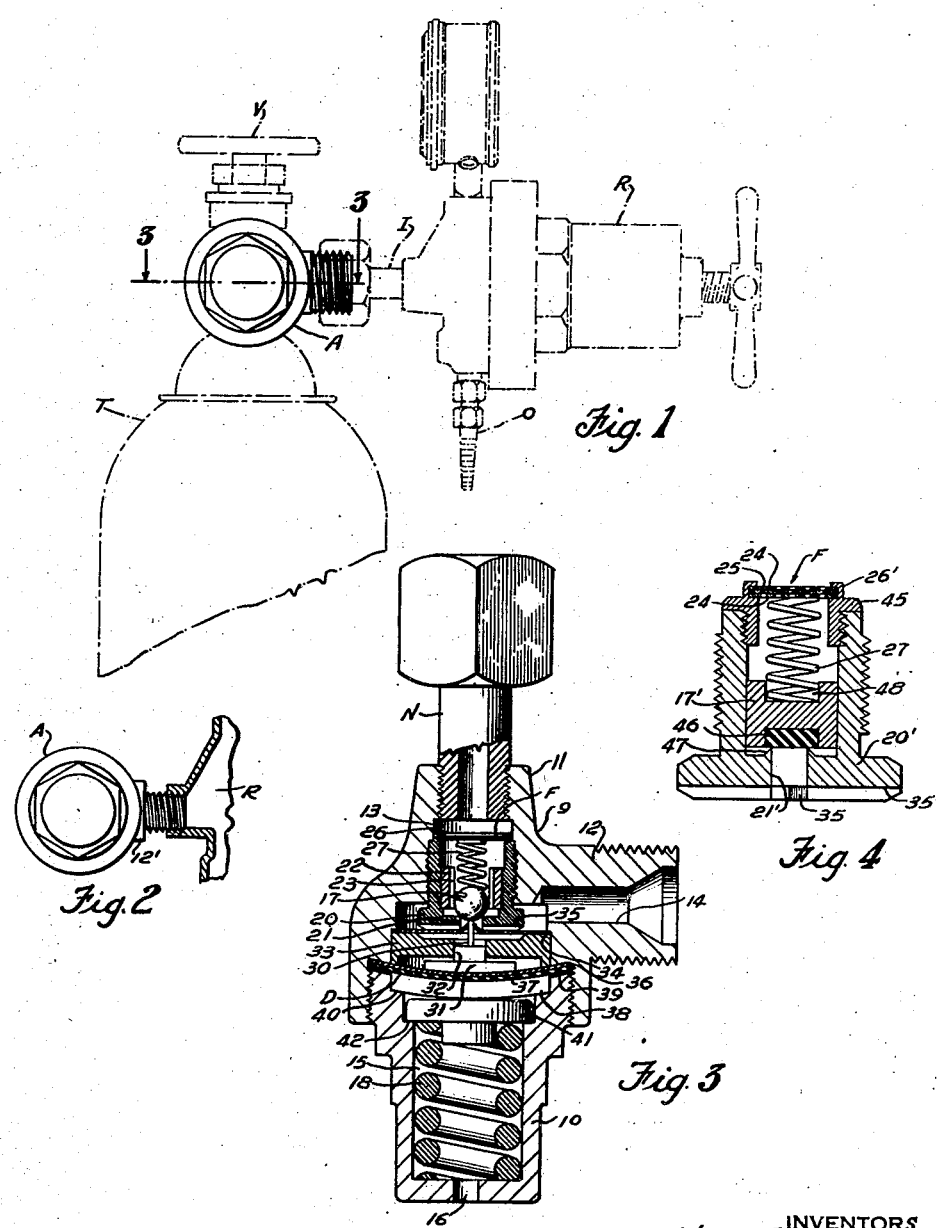

2,272,243

UNITED STATES PATENT OFFICE 2,272,243

FLUID CONTROL APPARATUS

Wilgot J. Jacobsson, Scotch Plains, and Samuel R. Oldham, Elizabeth, N. J., assignors to Oxweld Acetylene Company, a corporation of West Virginia Application June 30, 1937, Serial No. 151,094

9 Claims. (Cl. 50—23)

This invention relates to apparatus for the control of the flow of fluids, and more particularly to regulating apparatus used in the control of gases flowing from a high-pressure source.

In the control of the flow of high-pressure gases, such as oxygen and acetylene to apparatus used in the welding and cutting of metals—or oxygen and other gases flowing to equipment used in hospitals and the like for therapeutic or other purposes, pressure regulators are used to reduce to a satisfactory working pressure the pressure of gas flowing from a tank in which the gas is stored at high pressure; and also to provide a flow of gas to the equipment at a constant delivery pressure. Such regulators are usually either of the single-stage or the two-stage type. In either type of regulator the gas is received at the tank pressure, which varies from about 2,000 lbs. per sq. in. down to below 100 lbs. per sq. in., and is delivered to the equipment utilizing the gas at a pressure which may be as low as a few ounces per square inch for therapeutic equipment utilized in hospitals for the administration of oxygen to patients, and which may range from 5 lbs. per sq. in. for acetylene and 15 lbs. per sq. in. for oxygen used in welding up to 150 lbs. per sq. in. for oxygen used in cutting. When the pressure of gas is reduced in a single-stage of regulation by passing through a single valve-controlled port, the gas in expanding rapidly from an extremely high pressure to a much lower pressure is cooled considerably, and in very cold weather the small amount of moisture in the gas tends to freeze and to impair the operation of the valve. This disadvantage has been overcome by using a two-stage regulator, in which the gas is passed through a first-stage valve, the pressure being reduced to one intermediate between the tank pressure and that to be utilized in the equipment, and then passed through a second-stage valve in which the pressure is reduced from the intermediate pressure to the pressure at which it is utilized.

In a two-stage pressure regulator, it is necessary for the most effective regulation to reduce to a minimum the gas space or intermediate pressure zone lying between the first-stage valve and the second-stage valve, thereby reducing or eliminating the time lag between the operation of one and the resultant operation of the other.

Furthermore, in both single-stage and two-stage regulators, in case a worn valve or its seat is replaced, proper seating of an old valve on a new seat or of a new valve upon an old seat is sometimes difficult to achieve, particularly in cases where both the valve and the seat are replaced in the field. In addition, leakage of high-pressure fluids occurring when the first-stage valve does not seat properly may cause rupture or other serious injury to the diaphragm associated therewith. In case a heavy thick diaphragm is used, for greater strength, the clamping pressure exerted around the edges to insure a gas-tight seal produces a considerable distortion of the main portion of the diaphragm, which in turn produces injurious internal strains in the diaphragm material and causes a wrinkling effect, thus not only changing the operating characteristics but also reducing the active life of the diaphragm.

Among the more important objects of this invention are to provide an attachment adapted for use in conjunction with a single-stage regulator to effect two-stage regulation, and which will provide a minimum gas space or intermediate pressure zone between a valve forming part of the attachment and the valve of the regulator; to provide a unitary valve assembly in which the valve is adapted to seat properly, and which may be readily and quickly replaced as a unit by another such assembly in case either the valve or the seat thereof becomes worn, so that there will be a minimum of time during which the regulator is out of service, and a proper seating of the valve upon its seat will always be assured; to provide apparatus for guiding a valve-actuating device and for dampening vibrations thereof; and to provide a regulator diaphragm assembly and a diaphragm plate which will co-operate with the diaphragm assembly so as to prevent or resist rupture or failure of the same at high pressures.

Other objects and novel features of this invention will become apparent from the following description and accompanying drawing, in which:

Fig. 1 is a vertical end view of a first-stage attachment and associated parts illustrating one embodiment of this invention connected to a single-stage regulator and to a tank of compressed gas;

Fig. 2 is a fragmentary vertical end view of a modified first-stage attachment and associated single-stage regulator;

Fig. 3 is a longitudinal section on an enlarged scale of the first-stage attachment taken along the line 3—3 of Fig. 1, looking in the direction of the arrows; and Fig. 4 is a longitudinal section on an enlarged scale of a modified valve assembly.

Referring to Fig. 1, a tank T in which is stored a gas, such as oxygen or acetylene, at a high pressure, is provided with the usual cut-off valve V at the upper end thereof. A single-stage regulator R is provided with an outlet hose connection O, and an inlet connection I, the latter of which is connected to the outlet of a first-stage attachment A. The inlet of the latter is connected to the outlet of valve V. The outlet and inlet of the attachment A are relatively short and disposed at an angle to each other, so as to provide a more compact construction.

As illustrated in Fig. 3, the attachment A includes a suitable housing which comprises a body 9 having a spring cap 10 and a short inlet nipple N threadedly secured thereto at opposite ends. The body 9 has an internally-threaded boss 11, into which the nipple N is screwed. Disposed at right angles to the boss 11 is a relatively short externally-threaded boss 12 to which the inlet I of the single-stage regulator R is attached. The body 9 is provided with an inlet passage 13 extending through the boss 11, and an outlet passage 14 extending through the boss 12. The cap 10 encloses a spring chamber 15; and an aperture 16 provides communication between the chamber 15 and the atmosphere.

A unitary valve assembly is removably secured within the inlet passage and includes a valve 17 which is adapted to control the flow of fluid from the inlet passage 13 to the outlet passage 14. The relatively short boss 12 permits close-coupling of the attachment to the regulator R, so that the gas space or intermediate pressure zone between the valve 17 and the valve of the regulator R approaches a minimum. In some instances, it is desirable to provide a suitable threaded portion on the boss 12, as illustrated in Fig. 2 by the boss 12', for threading the latter directly into the casing of the regulator R.

A diaphragm assembly D, responsive to the pressure of fluid in the outlet passage and subject to the pressure of a spring 18 within the cap 10, is disposed so as to provide a wall of the chamber formed between the inlet passage 13 and the outlet passage 14 in the body 9 and is operatively associated with the valve 17 so that a drop or rise in pressure in the outlet passage below or above a predetermined value will cause the valve to open or close and thereby control the flow of gas from the inlet passage to the outlet passage, thus maintaining the pressure at an approximately constant reduced value.

The unitary valve assembly of Fig. 3 comprises a hollow externally-threaded bushing 20 which is secured in the inlet passage and is provided with a port 21 in one end thereof. The inner side of the port acts as a seat for the valve 17, which in this instance is a ball of corrosion-resistant metal. The metal ball is guided in a sleeve 22 secured within the hollow bushing 20 in a suitable manner, such as by a press fit; and a plurality of slots 23 in the sleeve permit the passage of gas past the ball. A filter assembly F, illustrated in detail in Fig. 4, comprises a pair of perforated metal discs 24 having a fine-mesh screen 25 disposed therebetween. The discs and screen are secured together and the filter assembly is permanently secured to the bushing 20 by suitable means, such as an annular lip 26 crimped over upon the peripheral edges thereof. A spring 27 is disposed within the hollow bushing, and bears at one end against the filter assembly and at the other end against the valve 17, and normally presses the valve against its seat to close the port.

The diaphragm assembly D, through pressure of the spring 18, is adapted to open the valve 17 through cooperation of a pin 30, which extends through the port 21 and forms a part of a stepped plate 31. The raised mid-portion of the stepped plate 31 is freely slidable in and guided by a central aperture 32 within a bushing 33, the latter of which has a marginal portion which is adapted to retain a disc 34 of thin resilient metal or other material within the body. The disc 34 is lanced in the center in the form of a cross or other similar design, and the plurality of pronged segments thus formed are in frictional contact with the pin 30—acting as a guide for the pin and also providing a snubbing action which dampens or retards vibration of the pin 30 during use. A plurality of transverse slots 35 in the outer face of the bushing 20 adjacent the disc 34 permit a free flow of gas from the port into the outlet passage 14.

The diaphragm assembly D comprises a relatively thin protective diaphragm 36 of corrosion-resistant metal, a relatively thin non-metallic pressure responsive and sealing diaphragm 37, and a relatively thick non-metallic backing or cushion member 38. The relatively thin non-metallic diaphragm 37 and the cushion member 38 preferably are composed of soft rubber or the like; and the metallic diaphragm 36 serves to prevent chemically-reactive gases such as oxygen, from attacking the rubber. The stepped plate 31 is attached to the metal diaphragm 36 in a suitable manner, such as by being riveted thereto.

Each of the relatively thin diaphragms 36 and 37 has an imperforate operating area or portion as shown, and said diaphragms are of larger diameter than the cushion member 38 and are clamped tightly at their peripheral edges between the cap 10 and the body 9, an effective seal being insured by means of a sealing ring 39 bearing against the diaphragm 37. The peripheral edge of the cushion member 38 is held in position between the diaphragm 36 and an internal shoulder 40, formed in the cap 10. A particular advantage of a relatively thick cushion member and a relatively thin diaphragm tightly clamped lies in the fact that the thin diaphragm will more easily follow a curved clamping surface and also that a greater clamping pressure may be exerted upon the thin diaphragm to provide a more effective seal, since if the same clamping pressure were exerted on the peripheral edge of a relatively thick diaphragm, a considerable distortion of the main body of the diaphragm would occur, and this distortion would produce a wrinkling effect which would not only change the operating characteristics but would also reduce the life of the diaphragm.

A diaphragm plate 41 is operatively interposed between the spring 18 and the cushion 38, and transmits the pressure of the spring 18 to the diaphragm assembly D, such pressure being transmitted from the plate 41 to the diaphragms 36 and 37 and uniformly distributed thereover through the cushion member 38. The plate 41 extends substantially to the wall of the chamber 15; and its movement in directions away from the diaphragm assembly D is limited by a second shoulder 42 formed in the cap 10. In case that at any time abnormally high pressures exist in the outlet passage 14, the shoulder 42 will limit the movement of the plate 41, and therefore that of the cushion 38 which latter underlies and supports the entire operating area or portion of the diaphragms 36 and 37, thereby preventing failure of the relatively thin diaphragms 36 and 37 at such pressures. In such instances, the cushion member will conform to and will fill up the small space normally between the diaphragm 36 and the plate 41 and shoulder 40 in the wall of the chamber 15. Since rubber is practically non-compressible (i. e.—rubber is resilient and will normally "flow" into a free space, but when restricted in "flow" in all directions, acts similarly to a liquid in being non-compressible) the cushion member 38 provides a solid body of material preventing injury to the thin diaphragms at the high pressure.

When the present invention is used in connection with apparatus utilizing only small amounts of gas, or when a more positive valve-seating effect is desired, it sometimes is desirable to provide non-metallic seating material for the valve. An adaptation of the unitary valve assembly to the use of such seating material is embodied in the alternative assembly illustrated in Fig. 4. This alternative assembly includes a hollow bushing 20', similar to the bushing 20 of the unitary valve assembly of Fig. 3, but internally threaded at the end opposite to its port 21'. An externally-threaded ring 45 is in threaded engagement with the bushing at that end and, to permanently secure the filter assembly F thereto, is provided with a lip 26' which may be crimped over upon the filter assembly. The valve comprises a multi-sided metal member 17', preferably square in transverse section, freely slidable within the hollow bushing 20', and having a central cavity containing suitable seating material 46, such as a hard rubber composition or the like, which is adapted to cooperate with an internally-extending lip 47 on the inner side of the port 21'. A second cavity 48 in the block 17' is adapted to receive an end of the spring 27, which at its other end bears against the filter assembly and normally presses the seating material 46 against the lip 47 to close the port.

It is to be understood that certain features of this invention, such as the unitary valve assembly and the diaphragm assembly, may be used in other fluid control apparatus in addition to attachments for pressure regulators; and that various changes may be made in the apparatus herein described falling within the spirit and scope of this invention.

What is claimed is:

1. Apparatus for controlling the flow of fluids, comprising a housing having inlet and outlet passages; a hollow bushing removably secured in said inlet passage and having a port through which the fluid flows from said inlet passage to said outlet passage; a valve disposed within said bushing for controlling the flow of fluid through said port; a spring within said bushing for normally pressing said valve against its seat to close said port; a diaphragm subject to the pressure of fluid in said outlet passage; resilient means for exerting pressure upon said diaphragm in opposition to said fluid pressure; means opatively connected with said diaphragm for actuating said valve, said last-mentioned means including a pin extending through said port and into contact with said valve; and a thin slotted disc of resilient material in frictional contact with said pin for dampening vibration of the same.

2. Fluid control apparatus comprising the combination with a valve and a fluid pressure-responsive diaphragm operatively associated therewith and having an imperforate operating area, of a flowable cushion member abutting against said diaphragm throughout the entire operating area thereof, a relatively rigid movable member abutting against said cushion member, means acting to limit the movement of said relatively rigid movable member, and means acting to limit the flow of said cushion member in directions away from said diaphragm, the arrangement being such that said diaphragm is free to function in response to normal variations in fluid pressures but is solidly supported over the entire operating area thereof by said cushion member upon the occurrence of an abnormally high fluid pressure on said diaphragm.

3. Fluid control apparatus comprising the combination with a valve and a fluid pressure-responsive diaphragm operatively associated therewith and having an imperforate operating area, of a flowable cushion member abutting against said diaphragm throughout the entire operating area thereof, and means acting to limit the flow of said cushion member in directions away from said diaphragm, the arrangement being such that said diaphragm is free to function in response to normal variations in fluid pressures but is solidly supported over the entire operating area thereof by said cushion member upon the occurrence of an abnormally high fluid pressure on said diaphragm.

4. Fluid control apparatus comprising the combination with a spring-closed valve and a fluid pressure-responsive diaphragm, of a member of thin resilient material lanced so as to form a plurality of pronged segments, a bushing having an aperture and a marginal portion engaging said member, a stepped plate mounted on said diaphragm and having a raised portion freely slidable in said aperture and guided by said bushing, a pin on said stepped plate adapted to cooperate with said valve, the pronged segments of said member formed by the lancing thereof being in frictional contact with said pin and acting as a guide therefor and also providing a snubbing action which dampens or retards vibration of the operating parts of the apparatus.

5. Fluid control apparatus comprising the combination with a spring-closed valve and a fluid pressure-responsive diaphragm, of a member of thin resilient material lanced so as to form a plurality of pronged segments, a plate mounted on said diaphragm, a pin on said plate adapted to cooperate with said valve, the pronged segments of said member formed by the lancing thereof being in frictional contact with said pin and acting as a guide therefor and also providing a snubbing action which dampens or retards vibration of the operating parts of the apparatus.

6. In apparatus for controlling the flow of fluids, a housing having an inlet passage and an outlet passage; means for controlling the flow of fluid from said inlet passage to said outlet passage; means responsive to the pressure of fluid in said outlet passage for actuating such control means, such pressure-responsive means including at least one relatively thin diaphragm clamped tightly around its periphery and having an imperforate operating portion subject on one side to the pressure of fluid in said outlet passage, a diaphragm plate, and a relatively thick cushion member composed of resilient material disposed between said plate and said diaphragm;

a spring exerting pressure on said plate for transmission from said plate through said cushion member to the other side of said diaphragm in opposition to such fluid pressure; and means for limiting the movement of said plate in directions away from said diaphragm, said cushion member occupying substantially completely the space between said plate and said diaphragm when said plate is in engagement with such last-mentioned means so that the pressure transmitted to said diaphragm through said cushion member is uniformly distributed over said other side of said diaphragm.

7. In apparatus for controlling the flow of fluids, a housing having an inlet passage and an outlet passage; means for controlling the flow of fluid from said inlet passage to said outlet passage; means responsive to the pressure of fluid in said outlet passage for actuating such control means, such pressure-responsive means including at least one relatively thin imperforate diaphragm clamped tightly around its periphery and subject on one side to the pressure of fluid in said outlet passage, a diaphragm plate, and a relatively thick cushion member composed of resilient material disposed between said plate and said diaphragm; a spring exerting pressure on said plate for transmission from said plate through said cushion member to the other side of said diaphragm in opposition to such fluid pressure; means for limiting the movement of said plate in directions away from said diaphragm; and means for limiting the movement of said cushion member in directions away from said diaphragm, said cushion member occupying substantially completely the space between said diaphragm and such last-mentioned means and plate when said plate is in engagement with the means for limiting its movement away from said diaphragm, whereby the pressure transmitted to said diaphragm through said cushion member is uniformly distributed over said other side of said diaphragm.

8. Apparatus for controlling the flow of fluids, comprising a body forming a chamber and having an inlet passage and an outlet passage; valve means for controlling the flow of fluid from said inlet passage to said outlet passage; a cap secured to said body and provided in the interior thereof with two shoulders adjacent each other; a diaphragm assembly including at least one relatively thin imperforate diaphragm clamped between said cap and said body and subject on one side to the pressure of fluid in said outlet passage; a resilient cushion member underlying and supporting the operating portion of said diaphragm assembly; means connected with said diaphragm assembly for actuating said valve means; a spring disposed within said cap for exerting pressure upon the other side of said diaphragm in opposition to such fluid pressure; a plate disposed between said spring and said cushion member and extending substantially to the walls of said chamber, one of said shoulders limiting the movement of said plate in directions away from said diaphragm, said plate and the other of said shoulders cooperating to limit the movement of said cushion member in directions away from said diaphragm, said cushion member occupying substantially completely the space between said diaphragm and such cooperating shoulder and plate when said plate is in engagement with such first-mentioned shoulder, whereby the pressure exerted on said other side of said diaphragm is uniformly distributed thereover.

9. The combination with fluid pressure-responsive diaphragm means having an imperforate operating area, of backing means therefor comprising a chamber provided with a wall movable to a limited extent, and a resilient flowable cushion member substantially filling said chamber and underlying and supporting the entire operating area of said diaphragm means.

WILGOT J. JACOBSSON.
SAMUEL R. OLDHAM.